July 16, 1968     M. C. KELLS     3,392,586
DEVICE FOR MEASURING PRESSURE
Filed March 8, 1966     3 Sheets-Sheet 2

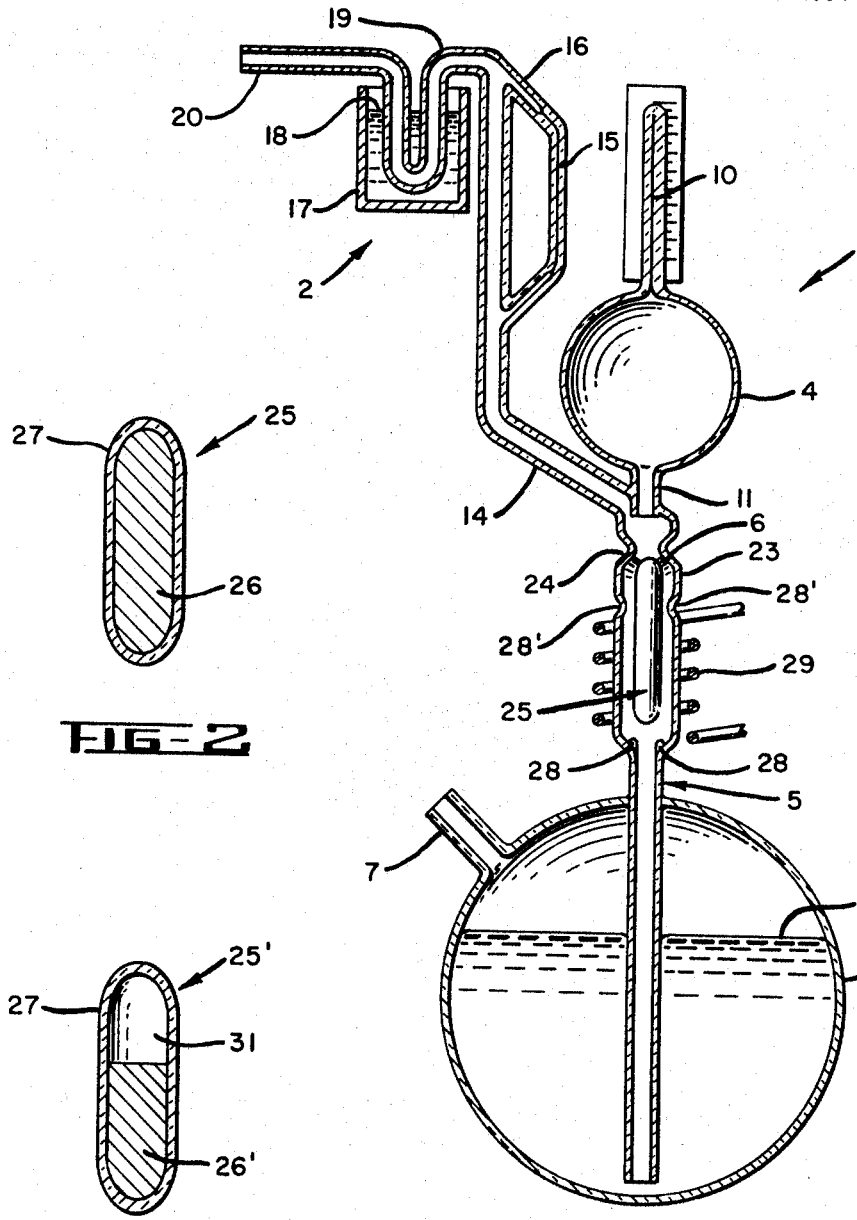

INVENTOR.
MILTON C. KELLS
BY
ATTORNEYS

United States Patent Office 3,392,586
Patented July 16, 1968

3,392,586
DEVICE FOR MEASURING PRESSURE
Milton C. Kells, Palo Alto, Calif., assignor to the United States of America as represented by the Administrator of the National Aeronautics and Space Administration
Filed Mar. 8, 1966, Ser. No. 534,975
11 Claims. (Cl. 73—400)

ABSTRACT OF THE DISCLOSURE

An improved McLeod gauge with means for eliminating the mercury diffusion effect. A valve seat and a valve member are positioned below the compression chamber and between the compression chamber and the mercury reservoir. Before equilibration, the mercury is raised to the valve seat (to prevent trapping gas) and the valve member is closed against the valve seat. Thus, mercury vapors from the mercury reservoir are prevented from pumping gas molecules (of the gas under measurement) toward the inlet and away from the compression chamber, and appreciable measurement errors are obviated.

---

The invention described herein may be manufactured and used by or for the Government of the United States of America for governmental purposes without the payment of any royalties thereon or therefor.

This invention relates to devices for measuring pressure and more particularly to improvements in pressure measuring devices of the type known as McLeod gauges.

The construction and operation of McLeod gauges are well known by those skilled in the art. By way of example, one discussion of the construction and operation of McLeod gauges is found in a book entitled, "Scientific Foundations of Vacuum Technique," by Saul Dushman, 2nd Edition, published by John Wiley & Sons, Inc. By way of brief explanation, a conventional McLeod gauge comprises a reservoir containing mercury and a compression chamber of known volume positioned above the reservoir and connected thereto by a passageway which will permit the flow of mercury from the reservoir to the compression chamber and back again. A conduit from the system whose pressure is to be measured is connected to the passageway between the reservoir and compression chamber. In order to operate the McLeod gauge the level of the mercury is brought in the passageway to a position just below the point where the passageway opens to the conduit for the system. In this condition the gas in the system is free to travel into the compression chamber so that the pressure in the compression chamber will be the same as the pressure in the system which is to be measured. Then the mercury is raised in the passageway and into the compression chamber, thereby cutting off the compression chamber from the source of pressure and also compressing the gas in the compression chamber. The gas is thus compressed in the compression chamber to a new known volume under the force of a known pressure of mercury. The McLeod gauge thus provides information with which it is possible, in accordance with Boyle's law, to calculate the pressure of the gas in the system.

McLeod gauges are often used for measuring the pressure in systems in which the introduction of any mercury vapor would be extremely detrimental. In addition, McLeod gauges are normally used to measure very low gas pressures in the presence of the mercury vapor of the gauge. Thus, the usual arrangement for employing a McLeod gauge includes a cold trap between the gauge and the system to be measured. In brief, a cold trap is simply an area along the conduit between the McLeod gauge and the system which is kept very cold so that mercury vapor escaping from the McLeod gauge and traveling toward the low pressure system will condense on the wall of the conduit and will not reach the system.

Apparatus of the type described has been used for many years and has formed an extremely valuable measuring tool. However, it has recently been realized that the travel of mercury vapor from the reservoir to the cold trap can introduce an appreciable error in the measurements given by the McLeod gauge. For example, the errors have been found to be as large as 25% where nitrogen is the gas whose pressure is being measured and 35% where xenon is the gas being measured. The reason for the inaccuracy is that the cold trap forms, in effect, a pump. The mercury vapor particles traveling toward the cold trap force some of the gas particles which are to be measured along to the cold trap, thus reducing the number of molecules and therefore the gas pressure in the compression chamber below the gas pressure which is in the system.

Accordingly, an object of the present invention is to provide a McLeod type gauge in which the mercury in the gauge is not exposed to the low pressure system during the period when the gas in the system is being introduced into the compression chamber.

Another object of the invention is to provide a McLeod type of gauge which can be employed without a cold trap and yet not introduce mercury vapor into the system whose pressure is to be measured.

A more specific object of the invention is to provide a McLeod type of gauge but having a valve for separating the mercury from the compression chamber and conduit to the system under test during the period when the compression chamber is open to the conduit.

Another specific object of the invention is to provide a McLeod gauge having a valve of the type described wherein said valve is positioned entirely within the McLeod gauge so that there is no possibility of mercury contamination or gas leakage.

A further specific object of the invention is to provide a McLeod gauge having a valve of the type described wherein the valve is operated by magnetic forces.

Another specific object of the invention is to provide a McLeod gauge having a valve of the type described wherein the valve is automatically operated by the change in pressure on the mercury which normally accompanies conventional operation of the McLeod gauge.

By way of brief description, an improved McLeod gauge made in accordance with a preferred embodiment of the invention comprises a valve seat and a cooperating movable valve member located in the passage between the reservoir and the compression chamber. The valve seat is located just below the point at which the conduit to the system under test connects to the passageway between the reservoir and compression chamber. The valve is kept closed while the pressure in the system is being introduced into the compression chamber. In this way there is no mercury vapor passing from the surface of the mercury toward the cold trap to, in effect, pump gas molecules away from the compression chamber to thereby give an inaccurate reading.

The various features and objects of the invention will become more apparent from the following detailed description wherein reference is made to the accompanying drawings in which:

FIGURE 1 is a partly schematic cross-sectional view of a McLeod gauge made in accordance with the invention and used in conjunction with a cold trap.

FIGURE 2 is an enlarged cross-sectional view of the valve member employed in FIGURE 1.

FIGURE 3 is a cross-sectional view similar to FIGURE 2, but showing a modified embodiment of the movable valve member.

Figures 4, 5:
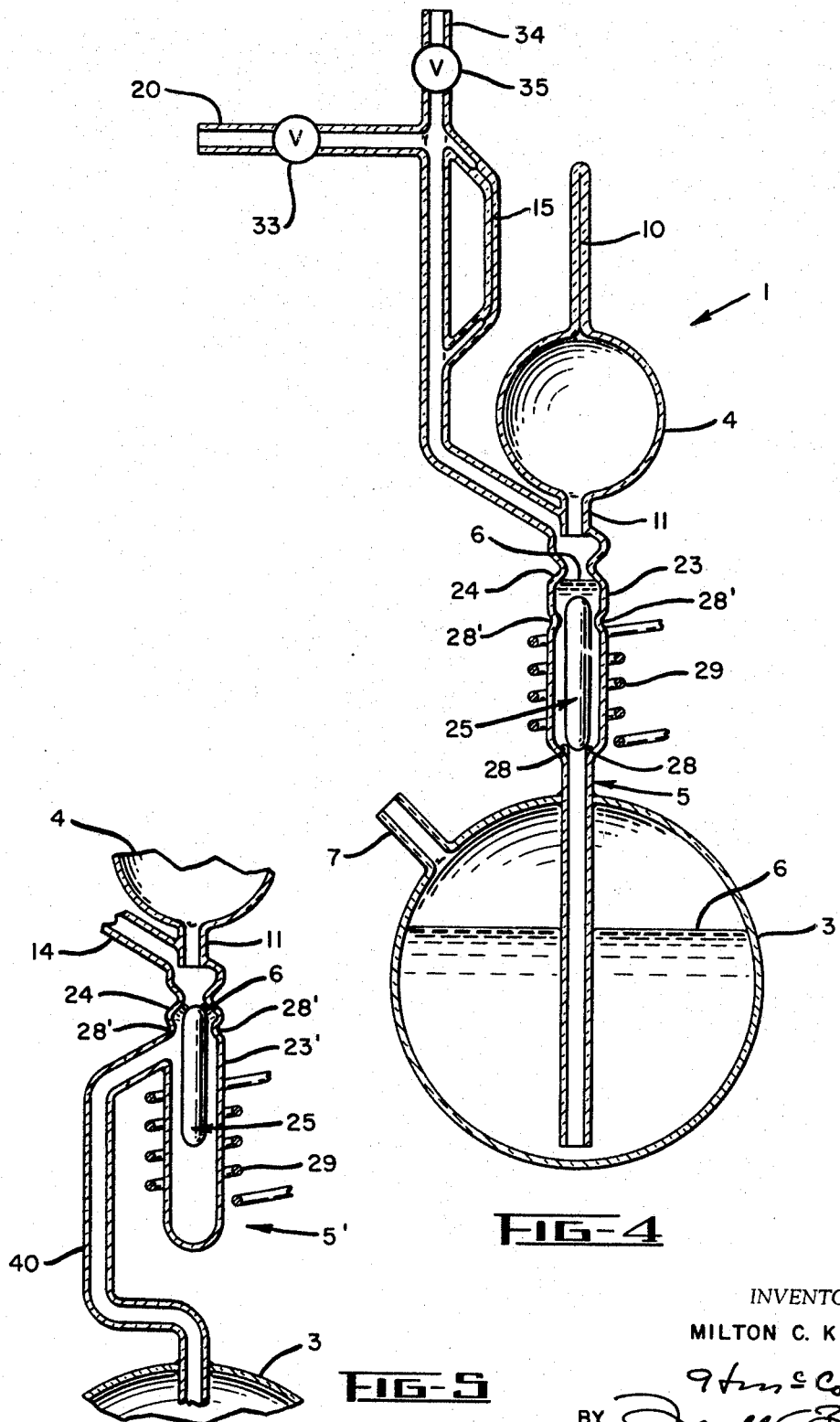
FIGURE 4 is a cross-sectional view similar to FIGURE 1, but showing the McLeod gauge employed in a system which makes it possible to omit the cold trap.
FIGURE 5 is a slightly enlarged cross-sectional view of a portion of the McLeod gauge of FIGURE 1 in the area of the valve member, and showing a modified configuration for the passageway between the reservoir and compression chamber.

Referring in more detail to the drawings FIGURE 1 shows a McLeod type of gauge 1 connected by a cold trap 2 to a system whose pressure is to be measured. The McLeod gauge comprises a reservoir 3 and a compression chamber 4 interconnected by means of a passageway indicated generally at 5. The reservoir contains mercury to a level 6 under equilibrium conditions. A connection tube 7 is provided for the reservoir so that appropriate gas pressure can be introduced into the reservoir above the mercury for forcing the mercury upwardly in passageway 5 and into the compression chamber 4. The upper end of the compression chamber 4 includes a capillary tube 10. The lower end of the compression chamber 4 includes a short neck portion 11.

In order to connect the McLeod gauge to a system whose pressure is to be measured, a conduit 14 is connected to the passageway 5 adjacent the lower end of the neck portion 11 of the compression chamber. In order to avoid any inaccuracies caused by the capillary action of the capillary tube 10, a similar capillary tube 15 is provided in a branch 16 in the conduit 14. The cooling system 2 can be of any conventional construction and, for example, comprises a container 17 filled with a suitable coolant such as liquid nitrogen 18. In order to provide an effective cooperation with the cooling system, the conduit 14 is provided with a U-shaped cold trap 19 which dips down into the liquid nitrogen. The left end 20 of the conduit 14 can be connected in any suitable manner to any system whose pressure is to be measured. The entire McLeod gauge and the conduit 14–16 are all preferably made of glass.

The apparatus thus far described is substantially that of a conventional McLeod gauge. The improvement, according to the present invention, comprises the addition of a valve in the passage 5. More specifically, as shown in FIGURE 1, the passage 5 is provided with an enlarged portion 23 which is necked in at its upper end to provide a valve seat 24. A freely movable valve member 25 is positioned in the enlarged portion 23 for movement toward and away from the seat 24. The valve member 25 is, as shown in FIGURE 2, made of a bar magnet 26 coated with a glass sheath 27. Any other type of coating can be used as long as it does not react with the mercury. The upper end of the valve member 25 is, of course, shaped to provide a good closure when pressed against the valve seat 24. The lower end of the enlarged portion 23 is provided with three or four dimples 28 spaced equally around the axis so that when the valve member 25 moves downwardly and rests against the bottom of the enlarged portion 23, the mercury will be free to flow through passage 5 around the valve member 25. Dimples 28' may also be used to guide valve member 25 into valve seat 24.

The reason for employing a bar magnet 26 in the valve member 25 is to permit operation of the valve member without requiring shafts or other actuating members which would necessarily pass through the walls of the passageway 5 and thus provide a source of contamination, leakage, and resultant inaccuracies. Since the enlarged portion 23 is glass, or other non-magnetic material, the valve member 25 can be operated by a magnetic field whose source is located outside the enlarged portion 23. For example, an electrical coil 29 can be positioned around the enlarged portion 23. Thus by passing a current in one direction through coil 29, the valve member 25 can be forced upwardly to close against seat 24, and by passing a current through the coil 29 in the opposite direction, the valve 25 can be moved downwardly to rest against the dimples 28 and thus open the passageway 5. A contemplated modification would be to make the valve core 26 of simple non-magnetized magnetic material as distinguished from a permanent bar magnet. Also, the electrical coil 29 could be replaced by a permanent magnet which is manually raised or lowered to cause the valve member 25 to be similarly raised or lowered. Also, the valve member 25 can be made dense enough to sink in mercury and thus automatically open under the force of gravity, so that the magnetic force need only be employed for closing the valve. Alternatively, the valve could be made to have a specific gravity which is substantially less than mercury so that the valve member 25 would be tightly closed against the seat 24 by the buoyancy of the mercury, and the magnetic force need only be employed for opening the valve. Thus, as shown in FIGURE 3 the valve member 25' employs a bar magnet 26' which is substantially smaller than the casing 27 to provide a gas or vacuum area 31 so that the overall specific gravity of the valve member is substantially reduced and the valve member will be forcibly urged against the seat 24 by the buoyant action of the mercury.

In order to operate the apparatus shown in FIGURE 1, the end 20 of the conduit 14 is connected to the system whose pressure is to be measured so that the pressure in the system will be introduced into the compression chamber 4 including the capillary tube 10 and the neck portion 11. At the time the gauge is connected to the system to be tested, the valve 25 is preferably closed so that the surface of the mercury will not be exposed to the system. However, if the valve is not closed, vapor from the surface will be stopped in the cold trap. In any event, valve member 25 must be closed during the period when the compression chamber 4 is being equalized with the pressure in the system to be tested. The reason, of course, is to prevent mercury vapor from continually pumping gas molecules toward the cold trap during the period when the pressure in the chamber 4 is being equalized with that in the system to be tested.

Figure 6:
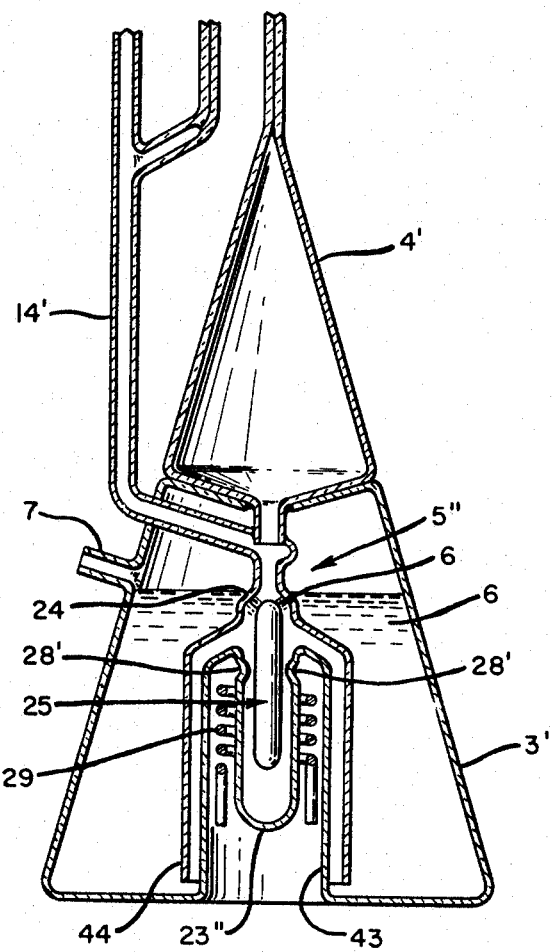
FIGURE 6 is a cross-sectional view similar to FIGURE 1, but showing a modified arrangement for the relative positioning of the compression chamber and reservoir and the passageway interconnecting them.

When valve member 25 is closed against seat 24, it should be understood that it is closed in such a manner that no gas is trapped below the abutting surfaces of the valve member 25 and the valve seat 24. If the valve were closed with gas trapped beneath the valve seal formed by the abutting surfaces of member 25 and seat 24, such gas would move up into chamber 4 when the mercury is subsequently raised to fill chamber 4. This extra gas would, of course, result in an erroneous reading. In order to prevent the trapping of gas below the valve seal, the level of the mercury is raised to a point on the valve seat just below the top thereof, as indicated in FIGURES 1, 4 and 6. Then, when the valve member is moved toward the valve seat, a capillary annular space is formed between the seat and the valve member. Thus, the capillary action of the mercury is such that as the valve closes, with the member 25 rising, the mercury between the mating faces of the valve member and seat moves down so that no mercury remains above the seal formed by the mating faces, and no gas is trapped below the valve seat. In FIGURES 1, 5 and 6, the valve member is shown moved almost to its closed position, and in FIGURE 4 the valve member is shown in its fully open position. In all of the FIGURES 1, 4, 5 and 6 the level of the mercury is shown along the surface of the valve seat near the top thereof, which is the required location at the time the valve member is closed.

After the valve is closed in the manner described, the pressure in chamber 4 is allowed to equalize with the pressure in the system to be tested. Then the valve member 25 is opened downwardly. The opening is caused by downward magnetic force from coil 29, or if the valve member is more dense than mercury it can be opened by simply removing the upward magnetic force. When the valve member 25 is opened, gas pressure through tube 7 will act on the surface of the mercury in reservoir 3 to force the mercury upwardly into the compression chamber 4 and upwardly into the capillary tube 10 so that the test sample of gas will be compressed into a very small new volume of known magnitude. At the same time that the mercury passes upwardly into the compression chamber 4 it will pass upwardly in the conduit 14 and into the capillary tube 15. The manner in which the pressure of the test sample is calculated is exactly the same as with a conventional McLeod gauge and, therefore, will not be detailed in this description.

The point to be made in connection with the present invention is that a conventional McLeod gauge does not have the valve means 24 and 25. The procedure employed with a conventional McLeod gauge is to raise the mercury level during the equalization period to a position about where the valve seat 24 is located. The mercury level is held at that position while the pressure in the compression chamber 4 is being equalized with the pressure in the system. It is during this period that mercury vapor passes along the conduit 14 toward the cold trap 2 where it is then collected by condensation. This passage of the mercury in effect forms a pump because the mercury vapor carries with it some of the gas molecules which would otherwise be passed into the compression chamber 4. As a result, the compression chamber 4 contains gas under a lower pressure than that actually present in the system to be measured.

Since the arrangement according to the invention provides a means for separating the surface of the mercury from the system during the equalization period, it becomes possible to employ the improved McLeod gauge without a cold trap. More specifically, FIGURE 4 shows an arrangement in which the McLeod gauge of FIGURE 1 is employed without a cold trap. The cold trap 2 is replaced by a valve 33, an additional line 34, and a valve 35 in the line 34. The arrangement shown in FIGURE 4 can be used in the following manner: Valve 33 is closed; valve 25 is closed; line 34 is connected to a vacuum pump system; and valve 35 is opened. The closing of valve 25 is performed in the manner previously described to prevent any gas from being trapped below the valve seat. Thus, any mercury vapor from a previous operation which may be present above valve seat 24 is removed from the gauge and not permitted to reach the system to be tested. Then valve 35 is closed, and valve 33 is opened to equalize the compression chamber 4 and the system to be measured. At this point there are two alternative methods of proceeding, one is to open valve 25 before closing valve 33, and the other is to open valve 25 after closing valve 33. If valve 25 is opened before valve 33 is closed, the surface of the mercury will be temporarily exposed to the system to be tested. However, the duration of exposure can be so short that there is substantially no chance of mercury vapor reaching the system to be tested. More specifically, as soon as valve 25 is opened, there being gas pressure above the mercury in the reservoir, the mercury will rise into neck 11. As soon as the mercury rises enough to seal the neck 11, the valve 33 can be closed to prevent the passage of mercury vapor to the system to be tested.

Alternatively, valve 33 can be closed before valve 25 is opened so that valve 33 is not open for even an instant when valve 25 is open. Thus, after chamber 4 has been equalized, valve 33 can be closed, and then valve 25 can be opened. The only objection to this alternative procedure is that with valve 33 closed, there is a trapped volume between valves 25 and 33 and, of course, including the compression chamber 4. Thus, as the mercury rises from the valve seat it will slightly compress gas in said trapped volume. This objectionable compression will, of course, cease as soon as the mercury seals off the bottom of the neck 11. Therefore, the slight objectionable change in volume can be substantially eliminated by making the volume between the valve seat 24 and the bottom of neck 11 as small as possible. The problem can be further minimized by connecting a supplemental or ballast chamber to conduit 14 so that said trapped volume would include the ballast volume, and, therefore, the change in volume caused by slight upward movement of the mercury, between seat 24 and neck 11, would be negligible. In any event, the error which might be introduced is extremely small compared to the error which mercury vapor flow causes in the absence of valve 25.

Regardless of which of the preceding alternative methods is employed, as soon as valve 25 is opened, the mercury will rise into neck 11 due to low gas pressure above the valve and higher gas pressure above the mercury in the reservoir. After the mercury is at least a few millimeters above neck 11, it is desirable to open valve 35. At this stage, valve 33 has, of course, been closed, either before or shortly after valve 25 was opened. The reason for opening valve 35 is to remove any gas from above the mercury in conduit 14 so that a simple and conventional measurement can be made after the mercury comes to rest in the capillaries 10 and 15. After the measurement is made, valve 25 being open, the pressure is reduced in reservoir 3 and the mercury is lowered to a point just below the top of valve seat 24. Then valve 25 is closed. At this stage valve 35 is already open, and as a result the gauge above valve 25 will be emptied of any residual mercury vapor and the rest of the gas from the test. The gauge is then ready to repeat the preceding steps to test a new sample.

The reason it is desirable to operate without a cold trap is that thermal transpiration can introduce an additional error which is not corrected by the presence of valve 25. Thermal transpiration results in a pressure difference being established between two parts of a system which are at different temperatures (when a temperature gradient exists along a tube). This effect is geometry dependent, which accounts for the common use of a symmetrical U-shaped cold trap, rather than a non-symmetrical one. In this way pressure measurement error due to thermal transpiration can be minimized, but it is preferable to eliminate it entirely by removing the substantial pressure differential which is inherent with a cold trap.

FIGURE 5 shows a modified configuration for the passageway 5 which interconnects the reservoir and the compression chamber. More specifically, the passageway 5' in FIGURE 5 has a branch conduit 40 instead of having a continuous straight line axis as does the passageway 5 in FIGURE 1. In other words, in FIGURE 5 the enlarged portion 23' is substantially a separate member and is closed at its lower end.

In view of the high density of mercury, some McLeod gauge constructions attempt to make the gauge more rugged, as shown in FIGURE 6, by resting the compression chamber 4' on top of the reservoir 3'. This construction, of course, permits the valve member 25 to be positioned inside the reservoir. However, where the valve 25 is designed for operation by an electrical coil or a movable permanent magnet, it is desirable to have an accessible space for location of the coil or magnet. Thus, in FIGURE 6 the lower end of the reservoir 3' is provided with a reentrant cylindrical wall portion 43. In FIGURE 6 the enlarged portion 23" of the passageway 5" is spaced inside the cylindrical wall 43 and is similar to the enlarged portion 23' of FIGURE 5. The passageway 5″ includes a cylindrical wall 44 surrounding the reentrant wall 43 to form an annular shape to the lower end of passageway 5″. Thus, the external member, such as coil 29, for operating the valve 25 can be conveniently positioned in place through the space formed by the reentrant wall 43. It should be noted that in the arrangement of FIGURE 6, the mercury level in the reservoir 3′ and in passageway 5″ can be the same when the level in passageway 5″ is at the desired position on the valve seat.

Figures 7, 8:
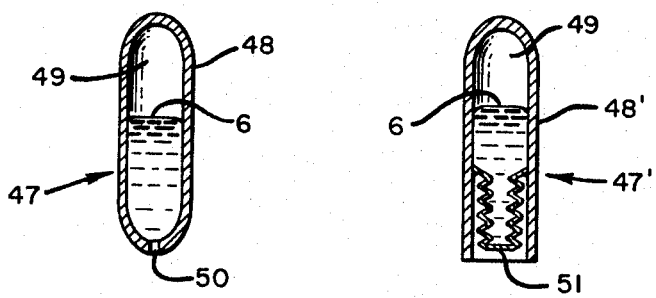
FIGURE 7 is an enlarged cross-sectional view showing a modified type of movable valve member.
FIGURE 8 is a cross-sectional view similar to 7, but showing a further modified construction for the movable valve member.

FIGURES 7 and 8 show modified constructions for the valve member so that the valve need not be operated by magnetic force. It should be understood that the size and shape of the upper end of the valve member in FIGURES 7 and 8 is the same as that shown for the valve members 25 and 25′ in order to provide good closing contact with the valve seat 24. The valves in FIGURES 7 and 8 operate on the principle of a cartesian diver. More specifically, the valve member 47 in FIGURE 7 comprises a shell 48 made of high density metal having a specific gravity higher than that of mercury, so that the shell by itself would sink in mercury if the inside of the shell were filled with mercury. However, instead of filling the inside of the shell with mercury, a pocket 49 of gas is trapped in the upper end of the shell. The gas which is used for this purpose must be insoluble in mercury; for example, xenon. The lower portion of the shell 48 is filled with mercury as indicated by the numeral 6, and an aperture 50 is provided in the bottom of the shell.

When the valve member 47 replaces valve member 25 in the enlarged portion 23 of the McLeod gauge as shown in FIGURE 1, for example, the mercury in the gauge will float the valve member 47 into closing contact with the valve seat 24. The reason, of course, is that the gas volume 48 is selected to be large enough to cause the valve member 47 to float in mercury when the mercury is below a given pressure. Thus, the valve member 47 automatically moves into closed position so that the pressure in the compression chamber 4 can be equalized with that in the system to be measured. Next, the gas pressure above the mercury in reservoir 3 is increased until the mercury is forced into valve member 47 through aperture 50 to reduce the volume 49 sufficiently to cause the valve member 47 to sink in the mercury. In this way, the valve will be open and the mercury will be forced up into the compression chamber 4 to make the necessary measurement. After the measurement is made, the gas pressure in reservoir 3 will be reduced allowing the mercury to move down out of the compression chamber 4 and allowing the volume 49 in the valve member 47 to expand and again float the valve member into closing position. The size of opening 50 will determine the response time of the valve. More specifically, the larger the opening the more quickly the valve will move after the mercury pressure outside the valve is changed. As in the case of the magnetic valves, the valve 47 should not be closed until the mercury level is just below the top of valve seat 24 to prevent entrapment of gas. Thus, when the mercury is moved down out of the chamber 4, it should be stopped just below the top of the valve seat. The valve 47 will not close prematurely because of the downward flow of mercury and because of its delay in responding after the pressure on the mercury is reduced to allow the mercury to flow down out of the chamber 4.

FIGURE 8 shows a construction similar to FIGURE 7 in which a valve member 47′ is made of a shell 48′ having a higher specific gravity than mercury. The lower end of the shell contains mercury 6 and the upper end contains a gas 49, such as xenon. However, instead of the aperture 50, a cylindrical metal bellows 51, or other elastic diaphragm, has its upper end sealed to the inner wall of shell 48′. In the case of valve member 47′ the gas volume 49 is such that in the relaxed condition of the bellows 51′ the composite member 47′ will float in mercury. However, when the mercury in which the valve member is floating is increased in pressure, the bellows 51 will be compressed upwardly, thereby forcing the mercury in the valve member to compress the gas 49 and thus increase the composite specific gravity of the member 47′ until it sinks in the mercury in the McLeod gauge. Since the valve 47′ does not have an aperture in it, other means can be employed for adjusting the time it takes to rise and close against the valve seat 24. For example, the depth of the enlarged portion 23 can be increased to increase the time required for the valve to move upwardly into closing position. Also, the dimples 28′, or equivalent contacting points, could engage the valve member with sufficient friction to delay its upward movement. These additional delay means can, of course, be used with valve 47 as well as with valve 47′.

Although specific details of the present invention are shown and described herein, it is to be understood that modifications may be made therein without departing from the spirit and scope of the invention as set forth in the appended claims. For example, it should be understood that valves 47 and 47′ are useful in any situation where it is desirable to have a valve open and close automatically in response to changes in the pressure of the fluid surrounding the valve.

Also, it is to be understood that although FIGURE 5 depicts the use of the arrangement 5′ in connection with the arrangement of FIGURE 1, where the compression chamber is spaced above the reservoir, it should be understood that the passage arrangements 5 and 5′ of FIGURES 1 and 5 could also be used in the arrangement where the compression chamber rests on the reservoir, assuming no coil 29 is used or is permanently built in place around portion 23 or 23′.

What is claimed is:

1. A McLeod gauge comprising wall means forming a reservoir for a liquid, wall means forming a compression chamber above said reservoir, wall means forming a passageway interconnecting said reservoir and said compression chamber, a conduit for joining said device to a source of pressure to be measured, said conduit being connected to said passage at a point intermediate the ends thereof, valve means in said passage on the reservoir side of the junction with said conduit, said valve means comprising a valve seat formed in said passage adjacent the lower edge of the junction between said conduit and said passage, and a valve member freely positioned in said passage below said valve seat for movement toward and away from said valve seat, said valve member being magnetic, and said valve member having a lower specific gravity than mercury whereby the buoyancy of mercury can close said valve, whereby when said valve means are closed said compression chamber can be connected to the source of pressure to be measured without permitting vapor from liquid in said reservoir to pass into said conduit.

2. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate the ends thereof, and valve means in said passage on the reservoir side of the junction with said conduit, whereby when said valve means are closed said compression chamber can be connected to the source of pressure to be measured without permitting vapor from liquid in said reservoir to pass into said circuit, said valve means comprising a valve seat formed in said passage adjacent the lower edge of the junction between said conduit and said passage, and a valve member freely positioned in said passage below said valve seat for movement toward and away from said valve seat, said valve member being magnetic, and said valve member having a higher specific gravity than mercury, whereby the valve member will be automatically opened by the force of gravity.

3. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate the ends thereof, and valve means in said passage on the reservoir side of the junction with said conduit, said valve means comprising a valve seat formed in said passage adjacent the lower edge of the junction between said conduit and said passage, and a valve member freely positioned in said passage below said valve seat for movement toward and away from said valve seat, said valve member comprising a shell of material having a greater specific gravity than mercury, said shell having mercury in the bottom thereof and a gas above the mercury, and said shell having an aperture in the bottom thereof, whereby when said valve means are closed said compression chamber can be connected to the source of pressure to be measured without permitting vapor from liquid in said reservoir to pass into said conduit.

4. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate the ends thereof, and valve means in said passage on the reservoir side of the junction with said conduit, said valve means comprising a valve seat formed in said passage adjacent the lower edge of the junction between said conduit and said passage, and a valve member freely positioned in said passage below said valve seat for movement toward and away from said valve seat, said valve member comprising a shell of material having a greater specific gravity than mercury, said shell having mercury in the bottom thereof and a gas above the mercury, the wall of said shell being open in one portion, and a deformable wall portion closing said opening, whereby when said valve means are closed said compression chamber can be connected to the source of pressure to be measured without permitting vapor from liquid in said reservoir to pass into said passage.

5. A pressure measuring device as claimed in claim 4, in which said deformable wall is a cylindrical bellows.

6. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate to the ends thereof, said passage having an enlarged portion adjacent the junction with said conduit on the reservoir side of the junction, a valve seat formed at the upper end of said enlarged portion, a valve member freely positioned in said enlarged portion for movement toward and away from said seat, said compression chamber being directly adjacent said reservoir whereby said passage is in said reservoir, said reservoir having a reentrant cylindrical wall portion in its bottom wall, said enlarged portion projecting down inside said cylindrical portion, and the lower portion of said passage comprising a cylindrical wall spaced around said cylindrical reentrant portion, and both of said cylindrical walls being connected to said enlarged portion adjacent the top thereof to form an annular passage between the two cylindrical walls.

7. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate to the ends thereof, said passage having an enlarged portion adjacent the junction with said conduit on the reservoir side of the junction, a valve seat formed at the upper end of said enlarged portion, a valve member freely positioned in said enlarged portion for movement toward and away from said seat, and the portion of said passage below said valve seat being connected to said enlarged portion above the bottom of said enlarged portion.

8. A McLeod gauge as claimed in claim 7, in which said valve member is magnetic.

9. A McLeod gauge as claimed in claim 7 in which said valve member comprises a shell of material having a greater specific gravity than mercury, said shell having gas therein, and means for changing the volume of said gas.

10. A McLeod gauge comprising wall means forming a reservoir for a liquid, wall means forming a compression chamber above said reservoir, wall means forming a passage interconnecting said reservoir and said compression chamber, a conduit for joining said device to a source of pressure to be measured, said conduit being connected to said passage at a point intermediate the ends thereof, and valve means in said passage on the reservoir side of the junction with said conduit, whereby when said valve means are closed said compression chamber can be connected to the source of pressure to be measured without permitting vapor from liquid in said reservoir from passing into said conduit, a branch line connected to said conduit between said valve and said passage, and a valve for selectively opening or closing said branch line.

11. A valve comprising a structure forming a valve seat and a container, a valve member movable in said container toward and away from said seat, said valve member having a compressible fluid therein and means for changing the volume occupied by said fluid in response to changes in pressure on the outside of said valve member, said volume changing means comprising a deformable wall portion on said valve member.

References Cited
UNITED STATES PATENTS

| | | | |
|---|---|---|---|
| 3,178,151 | 4/1965 | Caldwell | 251—137 |
| 3,190,124 | 6/1965 | Kreisman | 73—400 |
| 3,261,207 | 7/1966 | Gilmont | 73—403 |

DAVID SCHONBERG, *Primary Examiner.*

LOUIS R. PRINCE, DONALD O. WOODIEL,
*Examiners.*